(12) United States Patent
Pollard, V

(10) Patent No.: US 6,726,440 B2
(45) Date of Patent: Apr. 27, 2004

(54) WIND ENERGY CONVERTER

(75) Inventor: L. Levi A. Pollard, V, 3310 Scotts Ferry Rd., Appling, GA (US) 30802

(73) Assignee: L. Levi A. Pollard, V, Appling, GA (US)

( * ) Notice: Subject to any disclaimer, the term of this patent is extended or adjusted under 35 U.S.C. 154(b) by 6 days.

(21) Appl. No.: 10/102,937

(22) Filed: Mar. 22, 2002

(65) Prior Publication Data

US 2002/0146321 A1 Oct. 10, 2002

Related U.S. Application Data

(60) Provisional application No. 60/279,773, filed on Mar. 30, 2001.

(51) Int. Cl.[7] .................................................. F03D 3/01

(52) U.S. Cl. .......................................... 415/4.1; 416/98

(58) Field of Search .................... 415/4.1, 906; 416/98, 416/100, 117, DIG. 4; 290/44, 55

(56) References Cited

U.S. PATENT DOCUMENTS

| 1,302,899 | A | * | 5/1919 | Albisu | ............................. | 74/37 |
| 4,470,770 | A | * | 9/1984 | Grose | ............................. | 416/79 |
| 4,525,122 | A | * | 6/1985 | Krnac | ............................. | 416/80 |
| 5,009,571 | A | * | 4/1991 | Smith | ............................. | 416/79 |
| 5,324,169 | A | * | 6/1994 | Brown et al. | ................... | 416/83 |

* cited by examiner

Primary Examiner—Edward K. Look
Assistant Examiner—Igor Kershteyn
(74) Attorney, Agent, or Firm—W. Warren Taltavull; Manelli Denison & Selter PLLC

(57) ABSTRACT

A wind energy converter includes a support arm or post rotatably mounted on a base and having an upper free end; a pivot arm is pivotally mounted on the free end and has an end remote from the support arm; a pair of vanes are mounted on a pivot rod carried at the end of the pivot arm so that the vanes are free to rotate about the pivot rod; abutment arms are provided on the end of the pivot arm to limit the arc through which the vanes may rotate; at the other end of the pivot arm a linkage structure is provided to connect the other end of the pivot arm to an electrical generator.

11 Claims, 3 Drawing Sheets

WIND ENERGY CONVERTER

This application claims the benefit of Provisional Application No. 60/279,773, filed Mar. 30, 2001.

FIELD OF THE INVENTION

The present invention relates to wind energy converters and, more specifically, to a greatly simplified wind driven converter for use with an electrical generator of conventional construction. The present invention is more particularly characterized by a low initial cost and good efficiency over a greater range of wind velocity. The device is also distinguished in the simplicity of its structure and its reliability over an extended interval before requiring servicing.

BACKGROUND OF THE INVENTION

With the increasingly stringent regulations governing the use of fossil fuels to generate power, alternative sources of electrical power such as solar and wind power are becoming increasingly economical and attractive to the marketplace. In addition, in many remote areas in this and other countries, alternative sources of electrical power are becoming a necessity with increasing population density in such remote locations. However, as is frequently the case, the more remote the location, the more destitute are the inhabitants likely to be thus making an investment in alternative power generation on a scale so as to make it profitable or sufficient to meet the anticipated needs very improbable.

The prior art has proposed a large number of different structures for making use of a wind energy to generate electrical power. The structures have generally been complicated to install and difficult and expensive to maintain over long periods of time in view of the large number of moving parts that are required. In other arrangements, efficient operation could only be achieved where the velocity of the wind current averaged at a relatively large magnitude. This made the structures useful in only a relatively few locations. Typically, the designs of the prior art involved the construction of a windmill mounted at a selected height above the ground or structure on which it is supported. The rotary output of the windmill is usually connected to a crankshaft adapted to rotate a conductive coil or primary windings in a magnetic field in order to generate current in the secondary windings of the generator. Windmill structures typically are balanced annulus shapes thereby offering little if any mechanical advantage to overcome the weight of the primary windings of the generator together with the weight of the connecting linkages. As a consequence, it has frequently been necessary to construct the windmill with relatively large surface area vanes. As a consequence, the expense of construction has often been adversely affected.

SUMMARY OF THE INVENTION

The structure of the present invention greatly simplifies the operation of the surfaces interacting with the wind current thereby substantially reducing the cost of construction and greatly simplifying the maintenance required for the apparatus. In one embodiment, a post is mounted on a table about which the post is free to rotate to enable the apparatus to align itself favorably with the prevailing wind direction. The post supports adjacent one end a pivot arm pivotally mounted adjacent one end of the pivot arm. The remote end of the pivot arm supports at least one and preferably a pair of airfoil shaped vanes, which are mounted on a pin or rod extending through the pivot arm so that the pin will be at right angles or perpendicular to a plane in which the pivot arm will move in operation. Preferably, the vanes are eccentrically mounted on the pin or rod in a manner to favor movement into the wind.

The opposite end of the pivot arm is connected through a linkage to an input shaft of an electrical generator of conventional construction. In addition, motion limiting structure is carried by the pivot arm to limit the degree of pivoting that the vane or vanes are permitted. This will assure that the vanes assume an angular position relative to the wind flow that will cause the pivot arm to move from one limit position through an arc to an opposite limit position whereupon the position of the vanes changes to move the pivot arm back to its original position to repeat the cycle. With this arrangement, reliable operation over an extended period will be far less expensively achieved compared with the windmill structures common to the prior art.

The forgoing and other advantages will become apparent as consideration is given to the following description taken in conjunction with the accompanying drawings, in which:

DETAILED DESCRIPTION OF THE INVENTION

Figure 2:
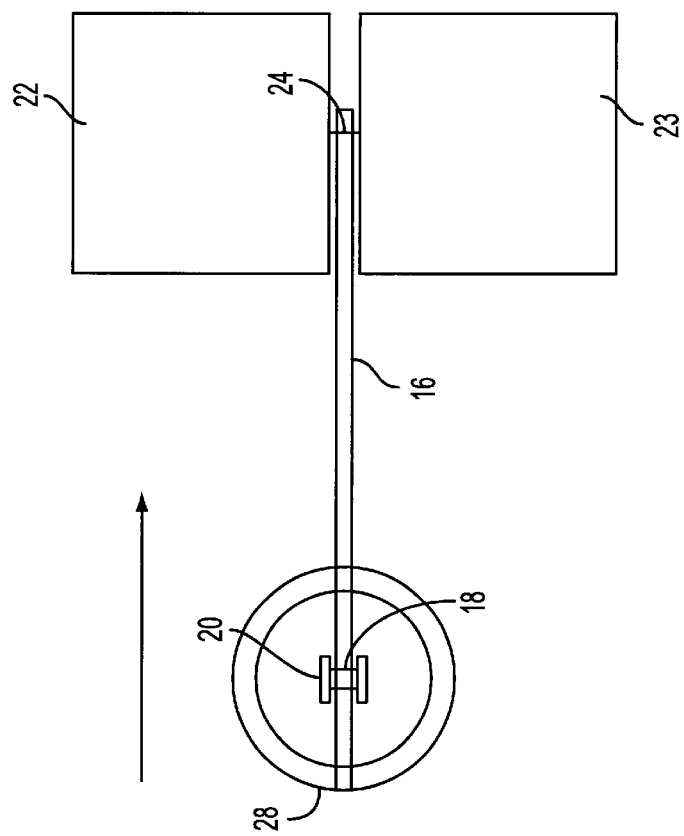
FIG. 2 is a top plan view of the apparatus of FIG. 1.
Figure 1:
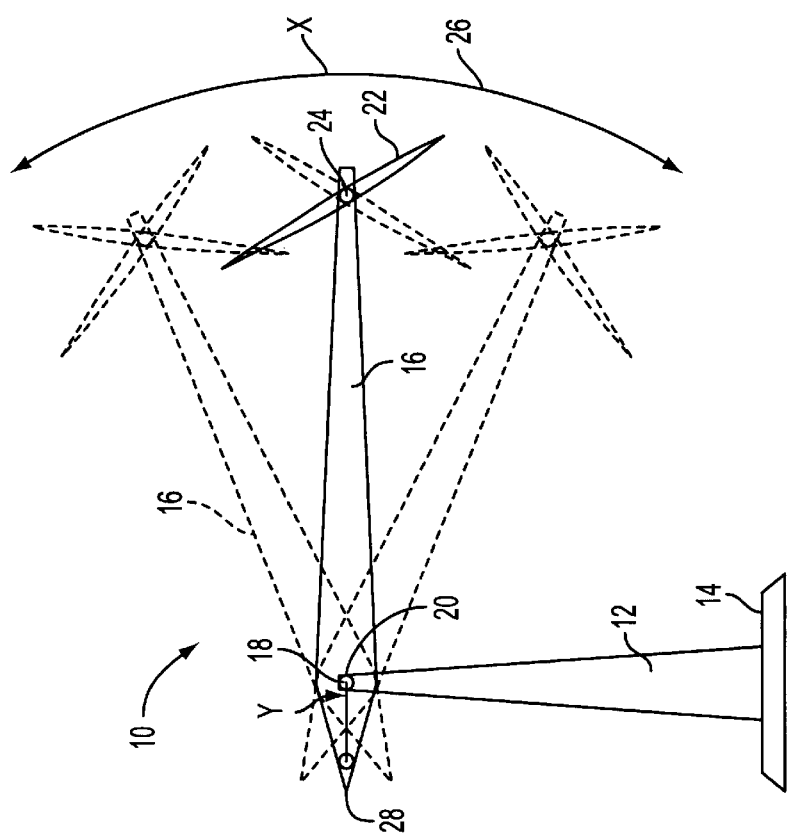
FIG. 1 is a side view in elevation of one embodiment of the present invention illustrating various dispositions of the pivot arm in operation.
Figure 3:
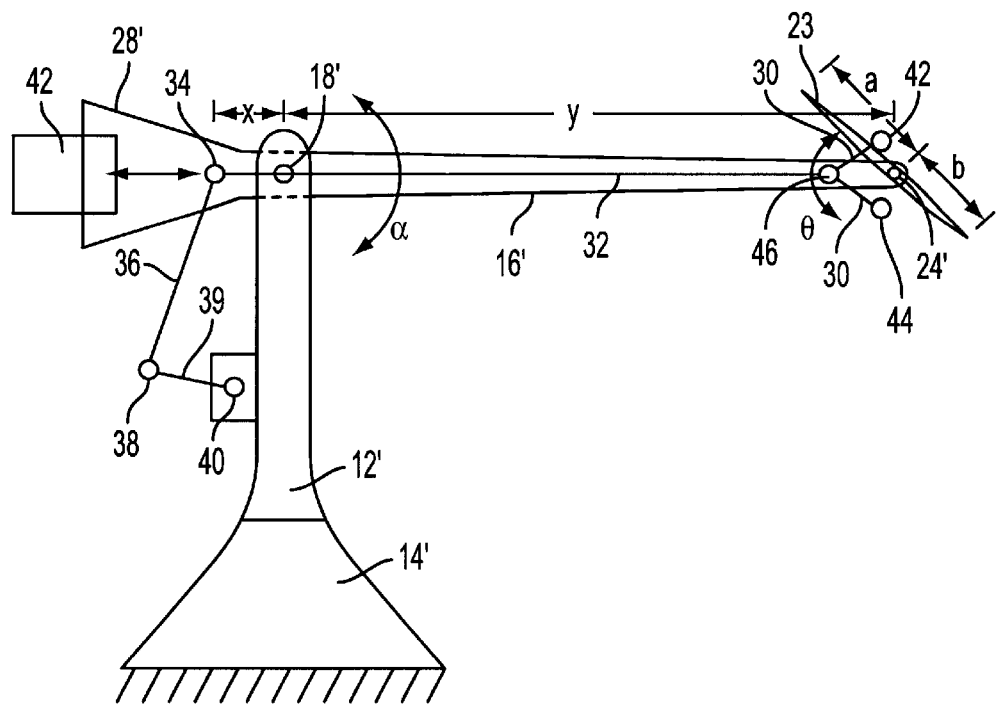
FIG. 3 is in view similar to FIG. 1 but showing a different embodiment of the present invention.

Referring to the drawings, wherein like numerals designate corresponding parts throughout the several views, there is shown in FIG. 1 a schematic illustration of the apparatus of the present invention generally designated at 10. The apparatus 10 includes an upright post or arm 12 which is rotatably mounted on a table 14 which may rest on a building roof or the ground. It is not essential that the post 12 extend vertically as will be apparent from the following description. At the top uppermost point 20 of the post 12, a pivot pin or rod 18 is provided and, for this purpose, the upper end 20 of the post 12 is bifurcated as shown more clearly in FIG. 2. The pivot arm 16 extends beyond the pivot pin or rod 18 to an opposite end 28. The other end of the pivot arm 16 is provided with a pin or rod 24 which extends through the arm 16 preferably using a tubular bearing and, in a preferred embodiment, the pin 24 is attached fixedly to two airfoil shaped vanes 22 and 23. In this embodiment, the vanes 22 and 23 will rotate in unison by virtue of the rigid connection to the pivot pin 24. In another embodiment, the connection to the pivot can 24 need not be rigid so that the vanes 22 and 23 will be free to rotate about the pin 24 independently. In a preferred form, the vanes 22 and 23 are mounted so that length a as shown in FIG. 3 is greater than length b on the opposite side of the pivot pin 24 or 24'. It is also preferable from an efficiency standpoint that the weight distribution of the pivot arm 16 be balanced about the pivot axis 18 and 18' and for this purpose, weight may be attached to the opposite end 28 so that the pivot arm 16 in the absence of any wind current will extend substantially horizontally to the ground.

As thus far described, it will be understood that the pivot arm 16 is preferably constrained to pivot through an arc generally designated 26 and the operation of the vanes 22, 23 will be effective to cause oscillating motion of the pivot arm 16 between the two extreme positions as shown in FIG. 1 in broken lines. A number of alternative mechanical devices may be employed to restrain rotational motion of the vanes 22, 23 in use and one such arrangement is shown in the FIG. 3 embodiment, as described below.

In FIG. 3, a side view in elevation of another embodiment of the present invention is shown where, as in the above embodiment, the post 12' is rotatably supported on a platform base 14' and includes a pin 18' that supports the pivot arm 16'. The pivot arm 16' differs from the arrangement of the previous embodiment in that the end 28' is enlarged to more readily accommodate a linkage array comprising link arms 32, 36 and 39 and the pivot joints 34, 38 and 40. A wind speed detector 42 of conventional construction is provided on the end of arm 16' and includes a link to arm 32 to shift arm 32 to the right as viewed in FIG. 3 when low wind velocities are detected and to the left when high wind velocities are detected. Thus, in a light wind, more vane area will be exposed to increase the lift while at a high wind speed, less vane will be exposed to reduce the lift and thereby the stress placed on the vanes and pivot arm 16'. The detector 42 may be a mechanical device as well as an electronic one as both types will be capable of shifting the arm 32 to effect the angular position of the vanes 22 and 23. The opposite end of the pivot arm 16' is provided with a pivot rod or pin 24' on which are mounted two vanes only one of which, 23, is shown in FIG. 3. It will be understood that the vanes arrangement will be the same as that shown in FIGS. 1 and 2.

Figure 5:
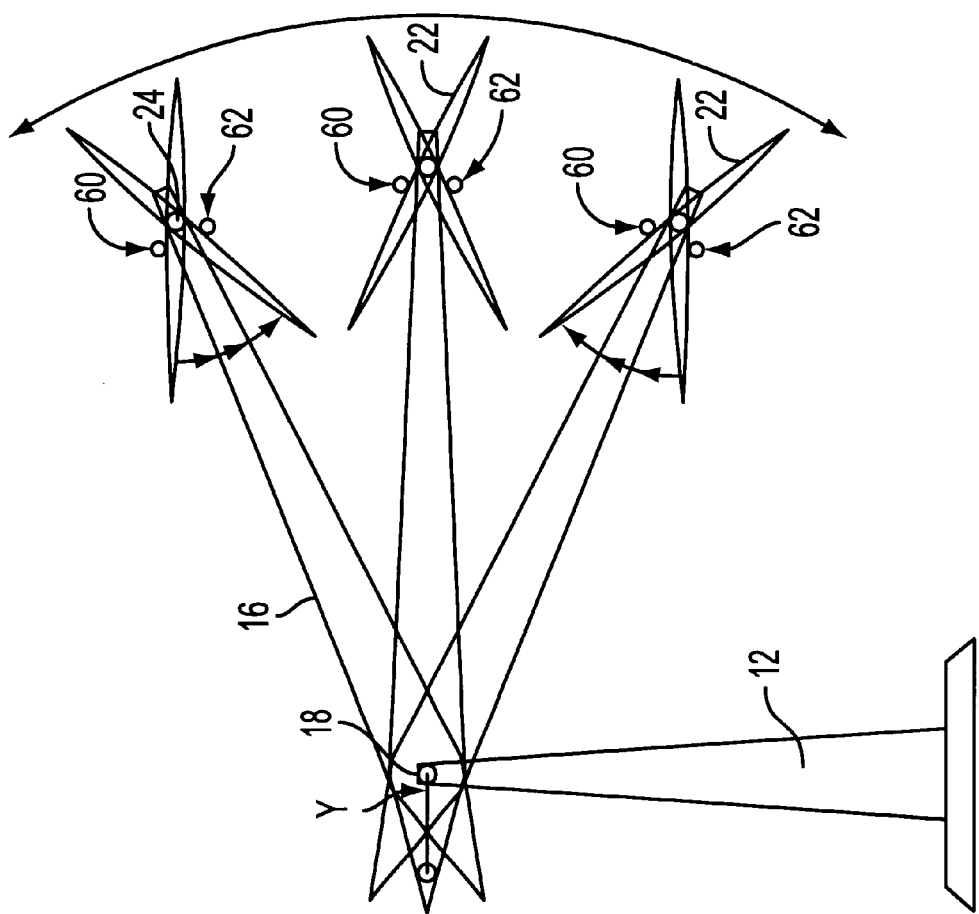
FIG. 5 is alternate embodiment of the invention.

The link arm 32 is mounted in a suitable manner on the pivot arm 16' and terminates in a joint 46 which is also located between the vanes 22 and 23 and includes link arm 30 which also extends between the vanes 22 and 23 without interfering with the movement of the vanes. Each of the link arms 30 terminates in a rod, 42 in the upper position and 44 in the lower position. These rods extend into the path of the vanes and as shown in FIG. 3, rod 42 is abutting the upper side of the vane 23 and will also be abutting the same side of the vane 22 although this is not shown in FIG. 3. This will prevent further rotation in a clockwise direction about the pivot axis 24'. With the assembly and vanes positioned as shown in FIG. 3, a net lifting force will be imparted to the assembly to lift the vanes and the pivot arm 16' in a counter clockwise direction about the pivot pin 18' as viewed in FIG. 3. As the pivot arm 16' moves about a neutral position, that is, one where the vanes 22 and 23 extend parallel to the wind direction, the weight of the pivot arm 16' combined with the lift afforded by the wind current will tilt the vanes either upwardly or downwardly to cause movement of the pivot arm. As movement commences, the leading edges of the vanes 22 and 23 will move into the wind direction due to the balance of the vanes about the pivot axis 24 and 24' in each embodiment. This movement will tend to shift the vanes 22 and 23 to expose the opposite side to the wind current so that the pivot arm 16 and 16' will commence movement in the opposite direction. Thus, the combination of the eccentric mounting of the vanes about the pivot pins 24 and 24' in each embodiment will cause the oscillating movement of the respective pivot arms 16 and 16'. Also, by restricting the angular movement of the vanes 22 and 23 about the pivot pins 24 and 24', the magnitude of the pivot arc of the pivot arm 16 and 16' will be restricted. To this end, the vane stops 42 and 44 may be employed in the FIG. 1 form as shown at 60 and 62 and also are preferably adjustable. For example, as shown in FIG. 5, the pivot angle of the vanes 22, 23 is restricted to correspond to a high speed wind condition, one vane being shown in its upper and lower pivot positions. As in the FIG. 3 form, by moving the stops 60, 62 away from the post 12 and toward the end 24 of the arm 16, pivoting through a greater angle will be permitted to accommodate low wind speeds.

Figure 4:
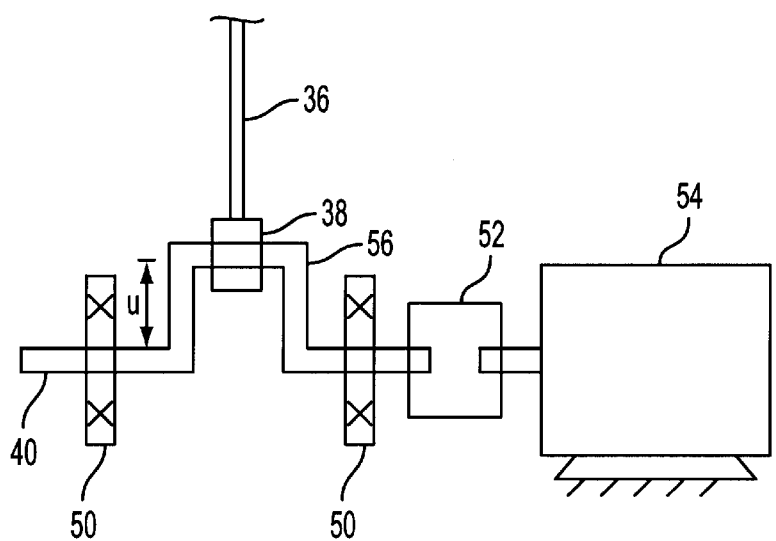
FIG. 4 is a detailed schematic view of a crank connection to an electrical generator useful with the present invention.

The oscillating movement of the pivot arms 16, 16' through an arc designated α in FIG. 3 and 26 in FIG. 1 can be utilized in a number of ways to generate current. With reference to FIG. 4, one manner of utilizing this motion is illustrated where a crank arm 36 is connected to a crankshaft 40 to a coupling 52 and an electrical generator 54 of conventional construction. Bearing supports 50 would normally be employed to support the crankshaft 40 and a coupling sleeve 38 mounts the crankshaft 36 to the shaft 40. The height of the portion 56 in the crankshaft 40 will define the stroke U of the apparatus.

A number of modifications to the disclosed apparatus will be apparent to those skilled in this technology and such modifications will be understood to constitute a part of the present invention.

What is claimed is:

1. Apparatus for converting wind energy into electrical energy with the use of a generator, the apparatus comprising a support arm adapted for mounting on the ground or a building and having a pivot arm pivotally mounted on said support arm, said pivot arm having one end remote from said support arm and a pivot axle carried on said one end, at least one vane structure rotatably mounted on said pivot axle, said pivot arm being constrained to pivot in a selected plane and said pivot axle extending generally perpendicular to said selected plane, said pivot arm including limit structure for allowing rotation of said vane through a selected arc so that, in a wind current, said vane will assume a position tending to impart pivoting movement of said pivot arm relative to said support arm, wherein said pivot arm includes an extension located on the opposite side of said support arm, said extension being connected by an arm link to an electrical generator.

2. The invention as claimed in claim 1 wherein said support arm is rotatably mounted on a base.

3. The invention as claimed in claim 1 wherein said pivot arm includes abutment members with one abutment member being located on one side of said pivot axle and another abutment member being located on the other side of said pivot axle, said abutment members being located to engage said vane structure and limit the pivot arc of said vane structure.

4. Apparatus for converting wind energy into electrical energy with the use of a generator, the apparatus comprising a support arm adapted for mounting on the ground or a building and having a pivot arm pivotally mounted on said support arm, said pivot arm having one end remote from said support arm and a pivot axle carried on said one end, at least one vane structure rotatably mounted on said pivot axle, said pivot arm being constrained to pivot in a selected plane and said pivot axle extending generally perpendicular to said selected plane, said pivot arm including limit structure for allowing rotation of said vane through a selected arc so that, in a wind current, said vane will assume a position tending to impart pivoting movement of said pivot arm relative to said support arm wherein the position of said abutment members are adjustable relative to said vane structure.

5. Apparatus for converting wind energy into electrical energy with the use of a generator, the apparatus comprising a support arm adapted for mounting on the ground or a building and having a pivot arm pivotally mounted on said support arm, said pivot arm having one end remote from said support arm and a pivot axle carried on said one end, at least one vane structure rotatably mounted on said pivot axle, said pivot arm being constrained to pivot in a selected plane and said pivot axle extending generally perpendicular to said selected plane, said pivot arm including limit structure for allowing rotation of said vane through a selected arc so that, in a wind current, said vane will assume a position tending to impart pivoting movement of said pivot arm relative to said support arm wherein said pivot arm includes abutment members with one abutment member being located on one side of said pivot axle and another abutment member being located on the other side of said pivot axle, said abutment members being located to engage said vane structure and limit the pivot arc of said vane structure and wherein said abutment members are each rods extending perpendicular to said pivot arm on either side of said pivot arm.

6. Apparatus for converting wind energy into electrical energy with the use of a generator, the apparatus comprising a support arm adapted for mounting on the ground or a building and having a pivot arm pivotally mounted on said support arm, said pivot arm having one end remote from said support arm and a pivot axle carried on said one end, at least one vane structure rotatably mounted on said pivot axle, said pivot arm being constrained to pivot in a selected plane and said pivot axle extending generally perpendicular to said selected plane, said pivot arm including limit structure for allowing rotation of said vane through a selected arc so that, in a wind current, said vane will assume a position tending to impart pivoting movement of said pivot arm relative to said support arm and wherein said apparatus includes a wind speed detector having a link to a link arm connected to said abutment member located to limit the arc through which said vane structure is free to pivot.

7. The invention as claimed in claim 1 wherein said vane structure has opposite ends and said vane structure is mounted eccentrically on said pivot axle.

8. The invention as claimed in claim 7 wherein said pivot axle passes through said vane structure dividing said vane structure into two portions with one portion being closer to said support arm than the other portion, said one portion being larger than said other portion.

9. The invention as claimed in claim 1 wherein said support arm is mounted to extend substantially vertically.

10. The invention as claimed in claim 1 wherein said support arm has an upper free end and said pivot arm is pivotably mounted on said upper free end.

11. The invention as claimed in claim 10 wherein said upper free end is bifurcated having two portions supporting a pivot pin and said pivot arm extends between said two portions.

* * * * *